UNITED STATES PATENT OFFICE.

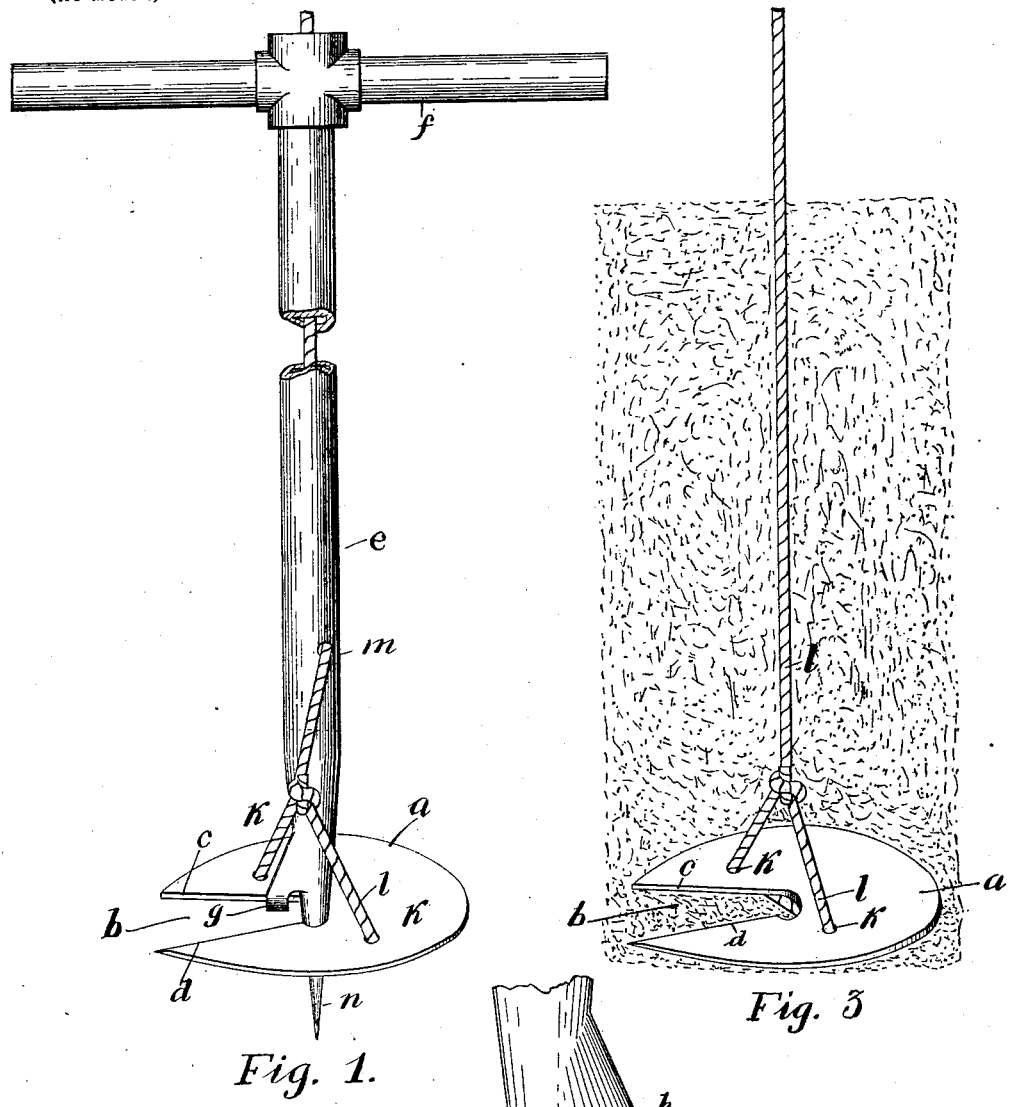

THOMAS E. HALLETT, OF CHICAGO, ILLINOIS.

LAND-ANCHOR.

SPECIFICATION forming part of Letters Patent No. 714,176, dated November 25, 1902.

Application filed April 5, 1902. Serial No. 101,531. (No model.)

*To all whom it may concern:*

Be it known that I, THOMAS E. HALLETT, a citizen of the United States, residing at Chicago, in the county of Cook and State of Illinois, have invented a certain new and useful Improvement in Land-Anchors, (Case No. 4,) of which the following is a full, clear, concise, and exact description, reference being had to the accompanying drawings, forming a part of this specification.

My invention relates to land-anchors, and has for its object the provision of an anchor which may also be an earth-penetrating blade or auger-bit, this blade being separably associated with a handle, so that it may be forced into the ground and disunited from the handle when the blade has penetrated a sufficient depth. In order to effect this separation between the blade and handle, I preferably provide the blade and handle with complementary locking portions or members, which are engaged to unite the handle and blade when the handle is rotated in one direction to force the blade into the ground and to disunite the handle from the blade when the handle is rotated in the opposite direction, whereupon the handle may be removed and the blade allowed to remain in the ground. The blade is provided with means whereby an anchoring wire or rope may be secured thereto, which anchoring-wire preferably passes into the interior of the handle near the blade, projecting through the top of the handle. By this arrangement the handle, wire, and blade all rotate together as the blade penetrates the ground. A slight contra twist or turn of the handle disengages the same from the blade, whereupon the handle may be slipped around the wire, which is preferably of a short length, being united at its upper free end to the wire or other element that is to be secured by the anchor. The complementary locking members serving to unite the handle and blade preferably comprise a bayonet-catch provided upon the lower end of the handle and the edge portion of a slot extending radially of the blade, this edge portion of the slot being sufficiently separated from the companion edge portion of the slot to permit the ready insertion of the bayonet-catch in the slot, the engagement of the bayonet-catch with the blade, and the ready removal of the bayonet-catch from the blade. The lower end of the handle is preferably pointed, extending below the blade and constituting practically a part of the auger-bit.

I will explain my invention more fully by reference to the accompanying drawings, in which—

Figure 1 is a view in perspective of the complete device of my invention. Fig. 2 is a detail of the lower end of the handle and bayonet-catch; and Fig. 3 is a view illustrating the auger-blade in place within the ground, the handle being removed.

Like parts are indicated by similar characters of reference throughout the different figures.

The blade portion or body $a$ of the auger-bit is preferably in the form of a disk, having a slot $b$, whose radial edge portions $c$ $d$ are preferably in different planes, the edge portion $c$ being above the edge portion $d$, which latter edge is preferably sharpened to constitute a knife-edge to provide a passage for the descending blade. The auger-blade is provided with a handle $e$, that is preferably hollow, being desirably formed of gas-pipe. This handle $e$ is preferably provided at its upper end with a cross-bar $f$, to be readily grasped by the hands in operating the auger.

The lower end of the handle $e$ is provided with a bayonet-catch $g$, whose horizontal faces $h$ $h$ engage the edge portion $c$, which is disposed between these horizontal faces, while the vertical face $i$ of the bayonet-catch engages the edge $c$ to force the blade in rotation as the handle $e$ $f$ is turned in a clockwise direction. After the blade has been driven into the ground a sufficient distance the handle $e$ $f$ may be rotated in a contra-clockwise direction, whereupon the bayonet-catch will be withdrawn from engagement with the edge portion $c$ of the auger-blade, permitting the handle to be withdrawn from the ground. The auger-blade is preferably provided with holes $k$ $k$, through which an anchoring-wire $l$ is passed, this anchoring-wire being formed into a loop, as indicated, and passing in a single strand through a hole $m$ in the handle portion $e$ to a point above the ground, where the said anchoring-wire may be united to the wire or other device to be secured in position after the handle has been completely withdrawn.

In order to cheapen the cost of the auger-blade, which desirably should be provided with an earth-penetrating point, this earth-penetrating point is provided upon the handle-rod *e*, as indicated at *n*, this point being preferably a solid wrought-iron continuation of the rod *e*.

It is obvious that many changes may be made from the device of my invention herein shown and particularly described without departing from the spirit of the invention, and I do not, therefore, wish to be limited to the precise device herein disclosed; but,

Having thus described my invention, I claim as new and desire to secure by Letters Patent—

1. The combination with an earth-penetrating portion or blade, of a handle therefor, and means whereby the handle, when moved in one direction may engage the blade to force the same into the ground and when rotated in an opposite direction will be separated from the blade to permit the removal of the handle, substantially as described.

2. The combination with a handle, of an earth-penetrating blade or portion, and a catch or locking device provided upon the handle and adapted to engage the blade or portion when rotated in one direction to force the blade into the ground and to be disengaged from the blade or portion when the handle is rotated in an opposite direction, substantially as described.

3. The combination with a handle, of a bayonet-catch provided thereon near its lower end, and an anchoring blade or body provided with a slot into which the said catch may extend to engage the blade when the handle is rotated in one direction and to be disengaged from the blade when the handle is rotated in the opposite direction, substantially as described.

4. The combination with a handle, of a bayonet-catch provided thereon near its lower end, and an anchoring blade or body provided with a slot into which the said catch may extend to engage the blade when the handle is rotated in one direction and to be disengaged from the blade when the handle is rotated in the opposite direction, the said handle being provided with an earth-penetrating point extending through the blade, substantially as described.

5. The combination with a handle, of a blade or earth-penetrating portion separably secured thereto, whereby the blade may remain in the ground after the handle is withdrawn, the lower portion of the handle being provided with an earth-penetrating point extending below the blade, substantially as described.

6. The combination with an earth-penetrating portion or blade, of a handle therefor, means whereby the handle when moved in one direction may engage the blade to force the same into the ground and when rotated in an opposite direction will be separated from the blade to permit the removal of the handle, and an anchoring wire or rope secured to the anchoring-blade and extending upwardly therefrom to be attached to the device or portion to be anchored, substantially as described.

7. The combination with a handle, of an earth-penetrating blade or portion, a catch or locking device provided upon the handle and adapted to engage the blade or portion when rotated in one direction to force the blade into the ground and to be disengaged from the blade or portion when the handle is rotated in an opposite direction, and an anchoring wire or rope secured to the anchoring-blade and extending upwardly therefrom to be attached to the device or portion to be anchored, substantially as described.

8. The combination with a handle, of a bayonet-catch provided thereon near its lower end, an anchoring blade or body provided with a slot into which the said catch may extend to engage the blade when the handle is rotated in one direction and to be disengaged from the blade when the handle is rotated in the opposite direction, and an anchoring wire or rope secured to the anchoring-blade and extending upwardly therefrom to be attached to the device or portion to be anchored, substantially as described.

9. The combination with a handle, of a bayonet-catch provided thereon near its lower end, an anchoring blade or body provided with a slot into which the said catch may extend to engage the blade when the handle is rotated in one direction and to be disengaged from the blade when the handle is rotated in the opposite direction, the said handle being provided with an earth-penetrating point extending through the blade, and an anchoring wire or rope secured to the anchoring-blade and extending upwardly therefrom to be attached to the device or portion to be anchored, substantially as described.

10. The combination with a handle, of a blade or earth-penetrating portion separably secured thereto, whereby the blade may remain in the ground after the handle is withdrawn, the lower portion of the handle being provided with an earth-penetrating point extending below the blade, and an anchoring wire or rope secured to the anchoring-blade and extending upwardly therefrom to be attached to the device or portion to be anchored, substantially as described.

In witness whereof I hereunto subscribe my name this 1st day of April, A. D. 1902.

THOMAS E. HALLETT.

Witnesses:
JOHN STAHR,
HARVEY L. HANSON.